(12) United States Patent
Michnik et al.

(10) Patent No.: US 8,457,808 B2
(45) Date of Patent: Jun. 4, 2013

(54) AUTOMATED INFRASTRUCTURE DELIVERY SYSTEM

(76) Inventors: Alisa Michnik, Cherry Hill, NJ (US); Yefim Michnik, Cherry Hill, NJ (US)

(*) Notice: Subject to any disclaimer, the term of this patent is extended or adjusted under 35 U.S.C. 154(b) by 1150 days.

(21) Appl. No.: 12/218,687

(22) Filed: Jul. 16, 2008

(65) Prior Publication Data
US 2009/0093922 A1 Apr. 9, 2009

Related U.S. Application Data

(60) Provisional application No. 60/959,710, filed on Jul. 16, 2007.

(51) Int. Cl.
| | |
|---|---|
| G05D 1/00 | (2006.01) |
| G05D 1/02 | (2006.01) |
| G06F 17/00 | (2006.01) |
| G06F 19/00 | (2011.01) |
| E01C 1/00 | (2006.01) |

(52) U.S. Cl.
USPC ............ 701/1; 701/23; 701/24; 701/117; 340/870.07; 340/910; 340/988; 404/1; 404/3; 404/84.05

(58) Field of Classification Search
USPC ............ 701/1, 2, 19, 20, 22–25, 33, 35, 36, 701/200–203, 206, 207, 300, 41, 116, 117, 701/301, 400, 408, 409; 340/870.01, 870.03, 340/870.07, 870.11, 870.16, 907, 901, 904, 340/905, 909, 910, 988, 989; 404/1, 2, 3, 404/6, 9, 83, 84.05
See application file for complete search history.

(56) References Cited

U.S. PATENT DOCUMENTS

| | | | | |
|---|---|---|---|---|
| 4,926,753 A | * | 5/1990 | Weiss | 104/88.03 |
| 5,598,783 A | * | 2/1997 | Lund | 104/88.04 |
| 5,836,529 A | * | 11/1998 | Gibbs | 246/122 R |
| 6,129,025 A | | 10/2000 | Minakami et al. | |
| 6,704,619 B1 | | 3/2004 | Coleman et al. | |

* cited by examiner

*Primary Examiner* — Thomas Tarcza
*Assistant Examiner* — Edward Pipala

(57) ABSTRACT

An automatic delivery system for an infrastructure comprising passenger transportation, freight delivery, electrical grid, oil, gas, water pipelines, communication, sewer removal, etc. The automation at the current state of technology is mostly achieved by enclosing the delivery system inside of an enclosure for achieving automatic weather independent transportation and eliminating costs related to protecting the aforementioned infrastructure components from outside elements. In addition, the system is simple enough to avoid traffic and collisions automatically by processing in real time just a single piece of information: a location of each vehicle; as the result, the system is inexpensive since no hardware is necessary for between-vehicles communications, for road condition detection, for GPS, etc. Plus every person will be able to use transportation on-demand with or without sharing a commute and at a desired comfort level including but not limited to entertainment, exercise, working on the go, etc.

10 Claims, 16 Drawing Sheets

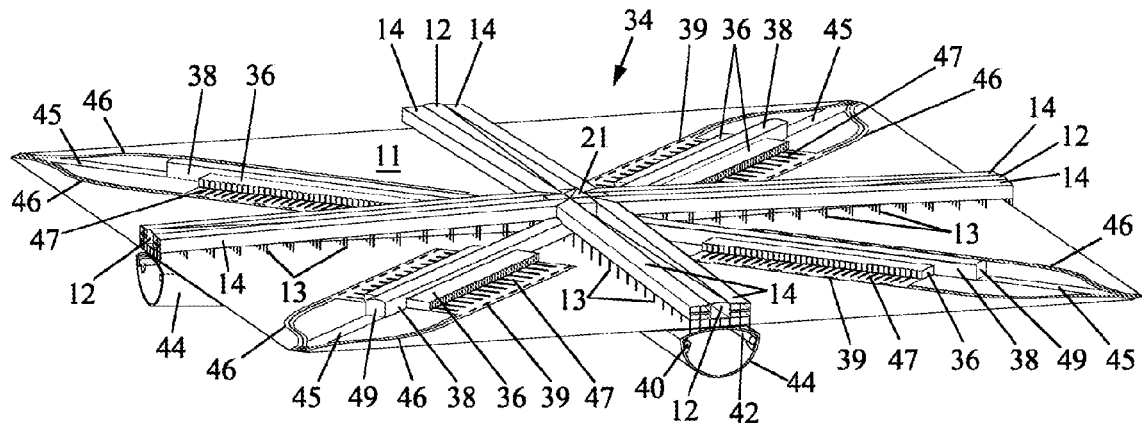
FIG. 3
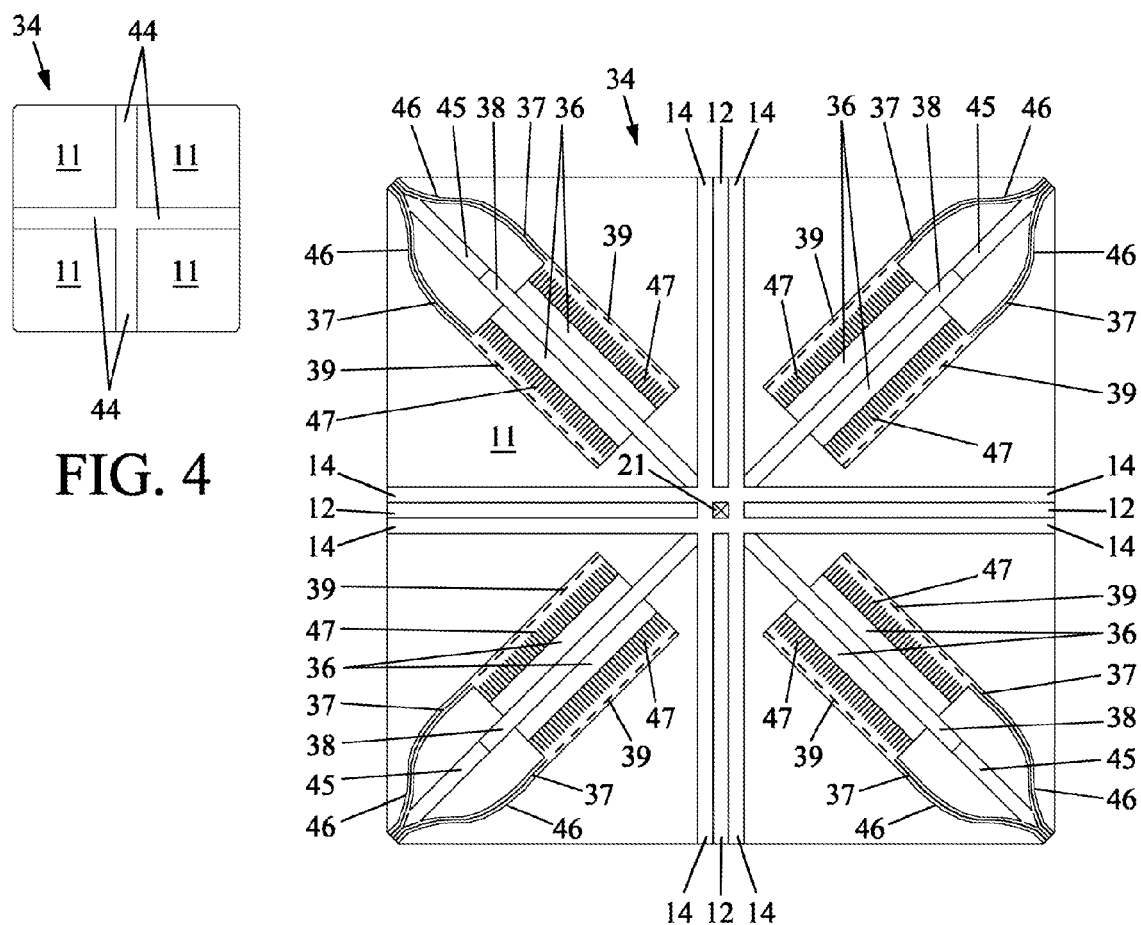
FIG. 4
FIG. 5

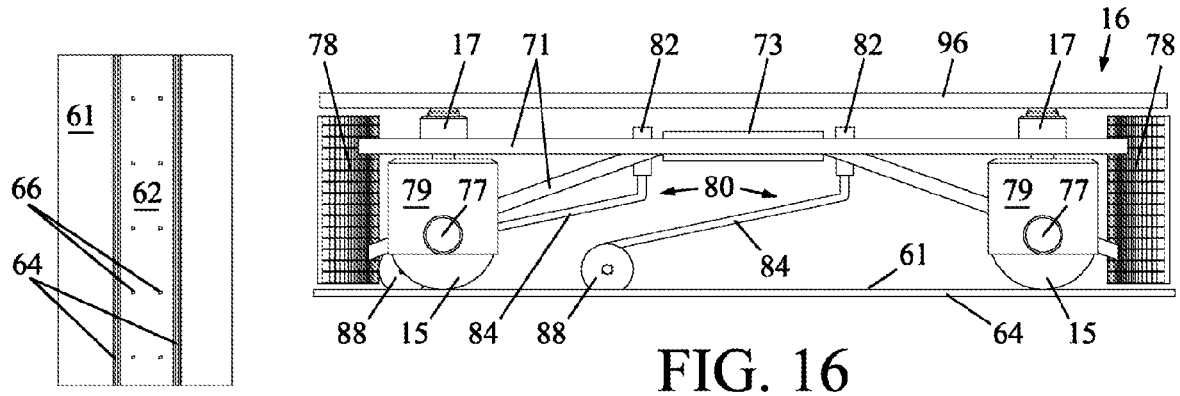
FIG. 15
FIG. 16
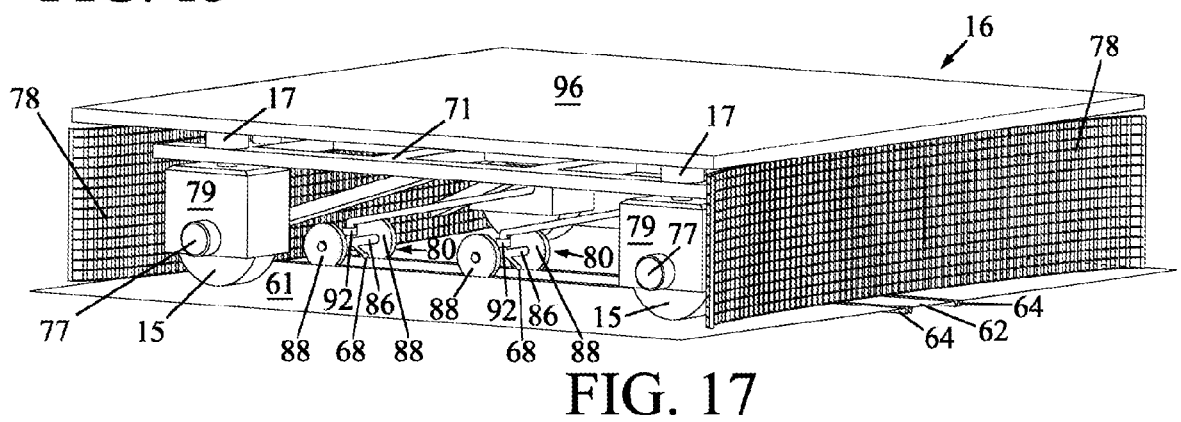
FIG. 17
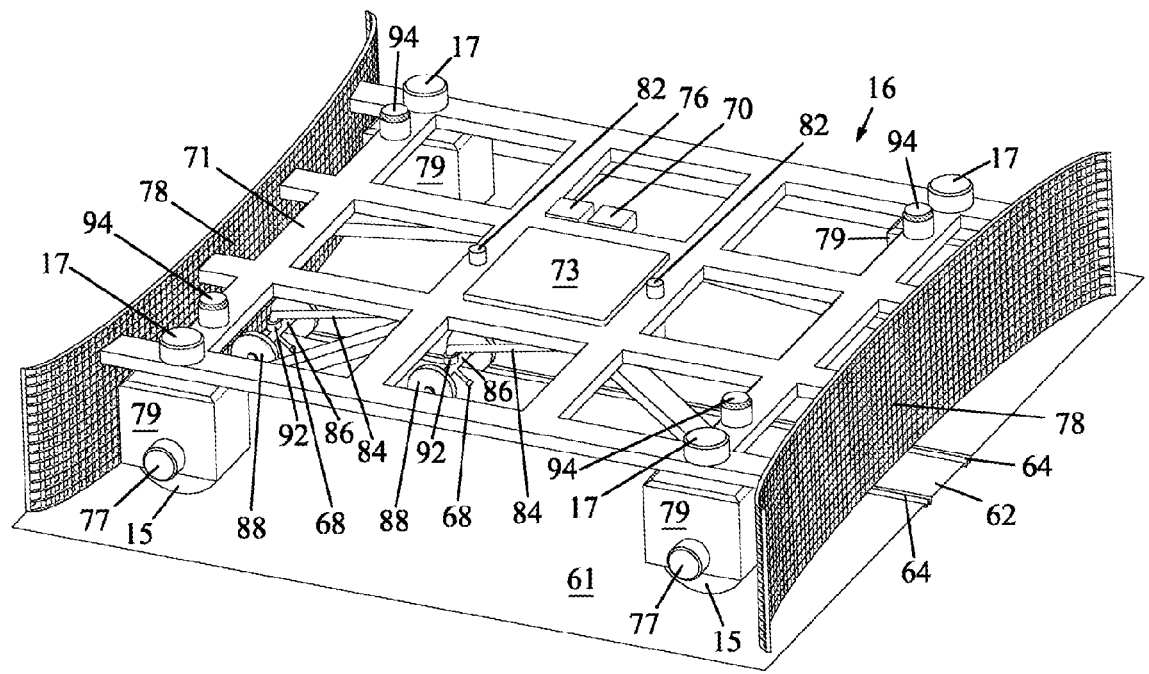
FIG. 18

AUTOMATED INFRASTRUCTURE DELIVERY SYSTEM

CROSS-REFERENCE TO RELATED APPLICATIONS

This application claims the benefit of U.S. Provisional Application Ser. No. 60/959,710, filed Jul. 16, 2007 by the present inventors.

BACKGROUND OF THE INVENTION

1. Field of the Invention

The present invention relates to a delivery system which automatically transports people, delivers freight, and provides other infrastructure related services without human guidance.

2. Background of the Invention

Since the current transportation system has numerous drawbacks such as traffic, injuries and loss of life due to the transportation process, to name a few, one can find in the art automated transportation systems as well as automated vehicles intended to improve the current transportation system.

For example, a traffic/transportation system described in U.S. Pat. No. 6,129,025 issued on Oct. 10, 2000 includes vehicles which are programmed to communicate with each other.

Automated machines described U.S. Pat. No. 6,704,619 issued on Mar. 9, 2004 include numerous sensors, GPS, etc., for operating at different terrains.

However, these prior art designs can not provide uninterrupted transportation since interferences from the outside environment such as a snowfall or tornado, for instance, can stop or slow down the transportation process. In addition, these designs include too much hardware and functionality included in the vehicles which increases cost per vehicle and decreases reliability. These designs are also limited to delivery of freight and transporting the passengers. They are not addressing other infrastructure associated delivery needs such as delivery of electricity, communication, sewer removal, etc.

Consequently, there is a need for an automated infrastructure delivery system which provides uninterrupted transportation of passengers and delivery for the infrastructure year round in any geographical area while overcoming the disadvantages of the prior art devices.

OBJECTS OF THE INVENTION

Accordingly, several objects and advantages of the present invention are:

To provide a safe transportation system by removing human factor from the transportation process resulting in virtually no injuries or loss of life due to the accidents related to the transportation process.

To provide a 24/7 transportation system which will reduce loss of life or health problems due to natural disasters, industrial accidents, dirt bombs, and other unforeseen events by providing the capabilities to automatically evacuate, relocate, and, due to availability of enclosed space within an enclosure, accommodate millions of people within hours while providing more than just necessities within shelters such as electricity, communication, water, food, medical and other supply delivery, sewer removal, and transportation.

To provide a safe and economical transportation system which will virtually eliminate loss of life or health problems resulting from the exposure to dangerous substances released during the transportation process inside of an enclosure and, consequently, eliminating the need for evacuation procedures and outside environment cleaning procedures To provide a high capacity transportation system which will handle larger traffic flow by guiding transportation vehicles inside and throughout multiple floors of an enclosure, keeping minimum distance between the transportation vehicles, and utilizing each of the transportation lanes for two-way traffic at the same time.

To provide an expandable transportation system which will allow expanding of existing floor space, adding floors to an existing enclosure, and adding additional enclosures while reusing the same electric power supply, communication, and control systems provided initially.

To provide a reliable transportation system by building it as a grid, resulting in uninterrupted operation if a part of the grid will get disabled due to earthquakes, accidents, terrorist attacks, etc.

To provide a weather independently constructed transportation system by building an enclosure from inside out, for instance, from prefabricated parts automatically delivered from production facilities using existing parts of the enclosure, further resulting in geographical area independent fixed cost per constructed mile.

To provide a weather independent transportation system functioning even in areas with harsh weather conditions while providing highest quality of living within the adjacent areas.

To provide an energy generating transportation system by short-circuiting remote regions with different air pressure via system's air pipelines, providing wind for the wind turbines, ventilation, preventing undesired weather conditions, collecting moisture.

To provide a climate change resistant transportation system which will continue to function during life threatening climate changes; an ice age, for instance, can be fought by relocating excessive snow from residential and industrial areas and bringing in food and supplies from areas unaffected by the ice age via an enclosure.

To provide a green transportation system by using outside surface of an enclosure for generating electricity by photovoltaic panels guided by the control system further contributing to the clean environment.

To provide a cost effective transportation system as a result of reducing employment costs, automated maintenance, and constant improvement of the control system software.

To provide a robust transportation system which will transport oversized objects such as houses and planes utilizing a set of adjacent lanes by synchronously moving transportation vehicles under guidance of the control system with no disruptions to the surrounding areas.

To provide a transportation system which serves as a conduit for an electrical grid drawing electrical power from remote unpopulated locations and, therefore, resulting in elimination of air pollution in populated areas. It will allow, for instance, building and maintaining nuclear reactors in remote unpopulated areas comfortably and inexpensively.

To provide a passenger transportation system on demand. For instance, a ten mile based grid system will virtually eliminate the need for personal vehicles used for long haul transportation and, consequently, will eliminate costs associated with owning a vehicle, and reduce traffic and aggravation caused by the traffic while providing extra time during the transportation process for work or relaxation on the go. Transportation within local grid cells may be provided by small electrical cars charged and, if necessary, rented out by the control system; or passengers may want to walk or use bicycles within the grid cells resulting in a healthier and happier community. As a result, oil will be reserved mostly for military and industrial use.

To provide fireproof transportation system by sealing an enclosure air tight; as a result, lack of fresh incoming oxygen will prevent a fire within the enclosure; the control system, in addition, will turn away other delivery vehicles and will bring in fire fighting and cleaning vehicles.

To provide a fire fighting transportation system by rapid delivery of fire fighting substances, when necessary, to any part of the grid based system for protecting from, for instance, forest fires once and for all.

To provide an agriculture friendly transportation system which, if an enclosure is built above ground, can act as a permanent shield or can deploy a temporary net for preventing undesirable insect migration for the benefits of the agricultural industry.

To provide an alternative transportation system helping to reduce existing highway load by considerably reducing or virtually eliminating long haul truck based commercial freight deliveries and passenger traffic and, as a result, reducing oil consumption, decreasing air pollution, reducing or virtually eliminating traffic on the highways, and, therefore, reducing cost of highway maintenance.

To provide a quiet transportation system which, due to the enclosure walls, will considerably reduce or virtually eliminate transportation noise, preventing complaints from the surrounding real estate properties and, as a result, will allow building new real estate properties closer to the system, as opposed to open air delivery systems.

To provide a convenient transportation system by allocating internal space for storage and emergency shelters.

To provide a protected transportation system where freight will be protected from thieves at all times by the enclosure walls in conjunction, for instance, with the remotely accessible surveillance system available to the customers on a 24/7 basis via the communication system.

To provide a terrorist resistant transportation system where freight and passengers will be scanned automatically for dangerous substances along with, for instance, freight and passenger weight monitoring. It will allow, for instance, detecting an object drop-off point and time.

To provide a covert transportation system where military or any other sensitive freight can be transported covertly under constant and secured surveillance. It will also allow to conceal military and other sensitive locations; and, in addition, it may change locations of the military and other sensitive objects at will or randomly in real time. It will also provide automatic capabilities for maneuvering the entire army simultaneously.

To provide a country border defense transportation system which will serve as a physical country border shield, where the control system provides monitoring and surveillance for the border patrol, while allowing freight and passenger pick up and drop-off at any of chosen points within or outside the border.

To provide an economy boosting transportation system which will cause expansion of a country economy by adding newly developed territories with quality of life comparable to the most developed parts of the world. In addition, it will allow to invite a desired pool of immigrants from around the world, if necessary, to populate new areas. It will also delay overpopulation problems, if any.

To provide a local community friendly transportation system, which in addition to all the utilities and conveniences brought by the system, will allow local artists to transform the enclosure walls into a piece of art thousands of miles long.

To provide an extraterrestrial transportation system where an air tight sealed enclosure can be adapted for colonization of other planets and mining asteroids.

Further objects and advantages of this invention will become apparent from a consideration of the drawings and ensuing description.

BRIEF SUMMARY OF THE INVENTION

The present invention may be generally described as an automated delivery system which can transport passengers and deliver freight regardless of weather. The delivery system is managed by a central control system defined hereinafter as CCS. The CCS is computer based and, therefore, can handle only a predetermined number of programmed situations. In order to achieve automation at the present state of computer technology, the delivery takes place inside of an enclosure which filters out interferences of the outside environment.

At minimum, the enclosure contains transportation lanes, ports for passenger and customer freight drop-off and pick up, a fleet of transportation vehicles adapted for freight delivery and passenger transportation, and a communication system for managing the ports and vehicles remotely by the CCS. In addition, the enclosure can contain, for instance, an electrical power supply system, pipelines for delivery of gases and liquids, fire detection and extinguishing system, surveillance system.

The electricity, communication, water, sewer removal, and other services can be made available to the populace outside of an enclosure under guidance of the CCS.

The features briefly described in this summary as well as other features and advantages of this invention will become apparent to those skilled in the art upon review of the following drawings, the detailed description, and the appended claims.

BRIEF DESCRIPTION OF THE DRAWINGS

FIG. 3 is a perspective view of an intersection of the delivery system;

FIG. 4 is a bottom view of the intersection depicted in FIG. 3;

FIG. 5 is a top view of the intersection depicted in FIG. 3;

FIG. 15 is a partial top view of a transportation lane;

FIG. 16 is a side view of a transportation vehicle;

FIG. 17 is a perspective view of the transportation vehicle depicted in FIG. 16;

FIG. 18 is another perspective view of the transportation vehicle depicted in FIG. 16 with the top platform not shown;

DETAILED DESCRIPTION OF THE INVENTION

Figure 1:
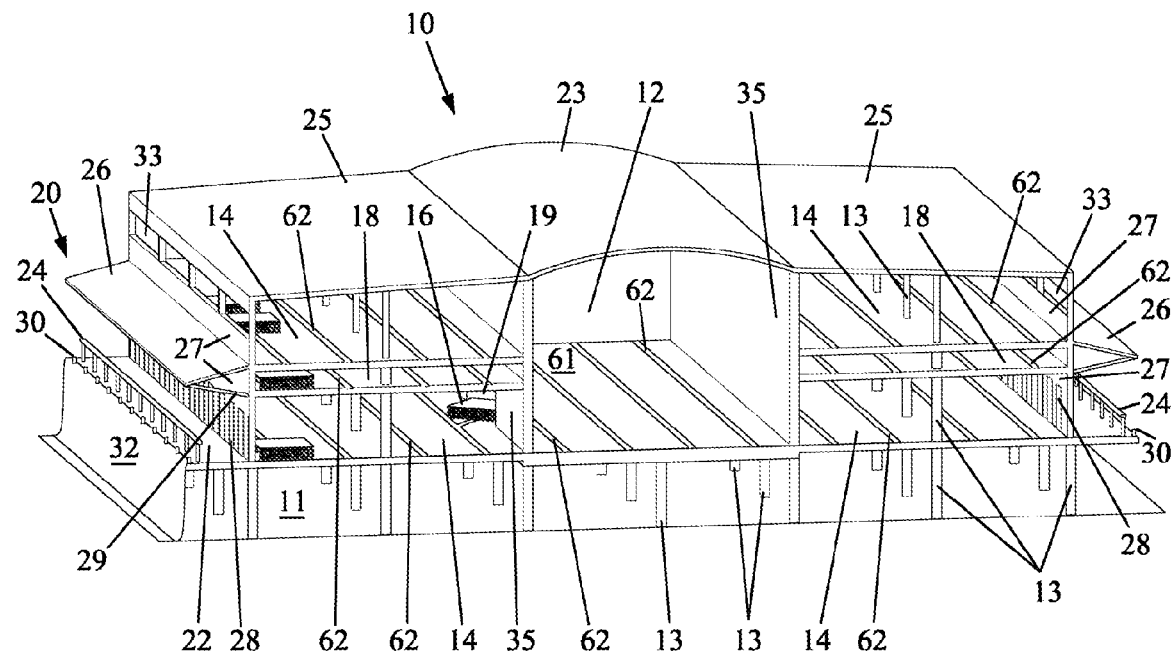
FIG. 1 is a perspective view of a portion of the delivery system.

A sample configuration of the delivery system illustrated throughout the drawings comprises an enclosure 10 built above ground 11, transportation vehicles 16, and a computer based central control system, defined hereinafter as CCS, (not shown in the drawings) supervised by authorized personnel. The CCS comprises software for automatic monitoring and managing predetermined activities of the delivery system.

Figure 2:
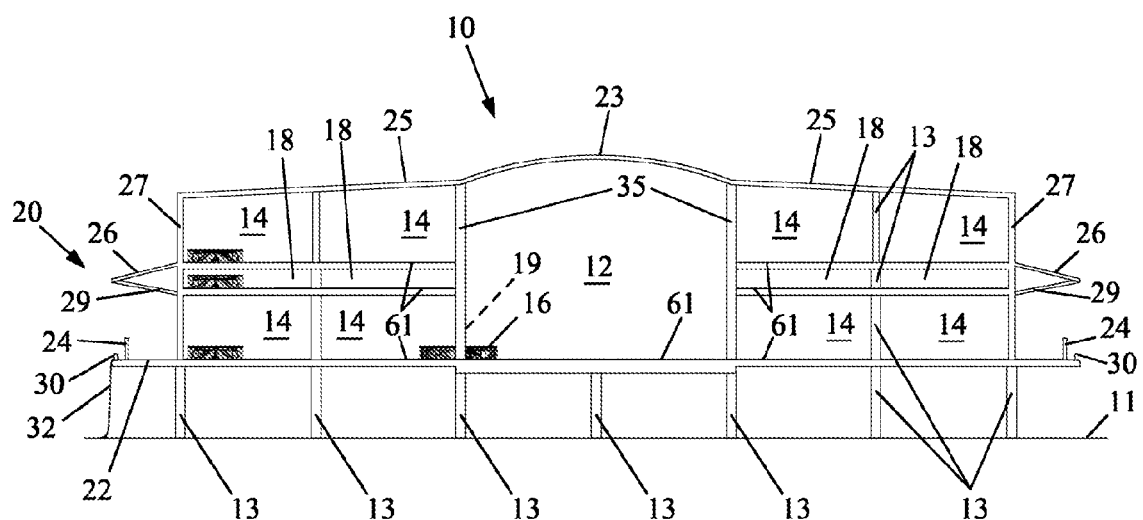
FIG. 2 is a side view of the portion of the delivery system depicted in FIG. 1.

Enclosure 10 (FIGS. 1 and 2) comprises a freight transportation section 12, four passenger transportation sections 14, two maneuver sections 18 for empty transportation vehicles 16, a roof 23 of freight transportation section 12, roofs 25 of passenger transportation sections 14, exterior walls 27, windows 33, a floor 61, columns 13 supporting floor 61, transportation lanes 62 located on floor 61, interior walls 35 isolating freight transportation section 12 from passenger transportation sections 14 and maneuver sections 18, a mouse hole 19 dedicated for switching of transportation vehicles 16 between the located on a same level freight transportation section 12 and passenger transportation sections 14, a boarding passenger section 20, and a net 32. Boarding passenger section 20 comprises a platform 22, railing 24, a roof 26, roof support 29, boarding doors 28, and net hooks 30. Net 32 is deployed using hooks 30 and can be removed when desired. The purpose of the net is to prevent undesirable migration of biological life and for slowing winds for the benefit of agriculture.

FIGS. 3-7 illustrate an enclosure intersection 34 comprising a decorative cap 21, numerous freight container terminals 36, four oversized freight terminals 38, a crude oil pipeline 40, a natural gas pipeline 42, ribs 43 for supporting pipelines 40 and 42, an oversized pipeline 44, roadways 45 for oversized freight terminals 38, and roadways 46 for freight container terminals 36 with traffic markings 37, 39, and 47. For clarity, the number of traffic markings 47 has been reduced in FIGS. 3, 6, and 7. The pipelines are managed with the standard industry stations: Initial Injection Stations, Partial Delivery Stations, Compressor/Pump Stations, Block Valve Stations, and Final Delivery Stations. Oversized pipeline 44 may be used for redirecting air mass between different air pressure geographical areas adjacent to enclosure 10, for storing and transferring water bodies, and, consequently, for generating electricity from air and water running through it.

Figure 6:
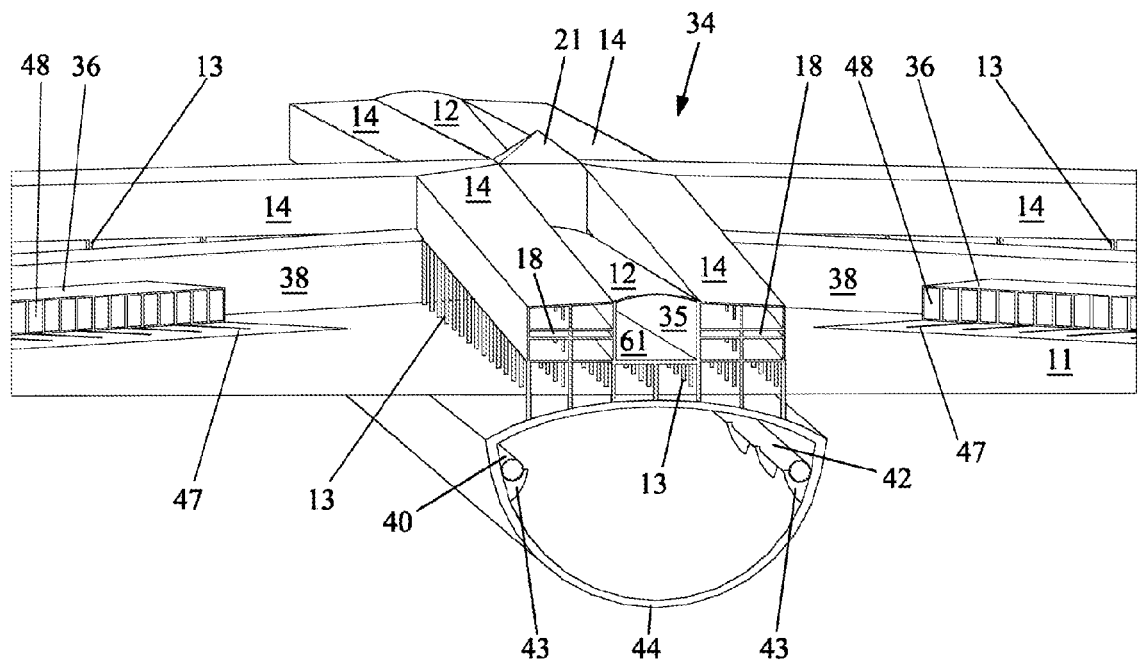
FIG. 6 is a partial enlarged prospective view of the intersection depicted in FIG. 3.
Figure 7:
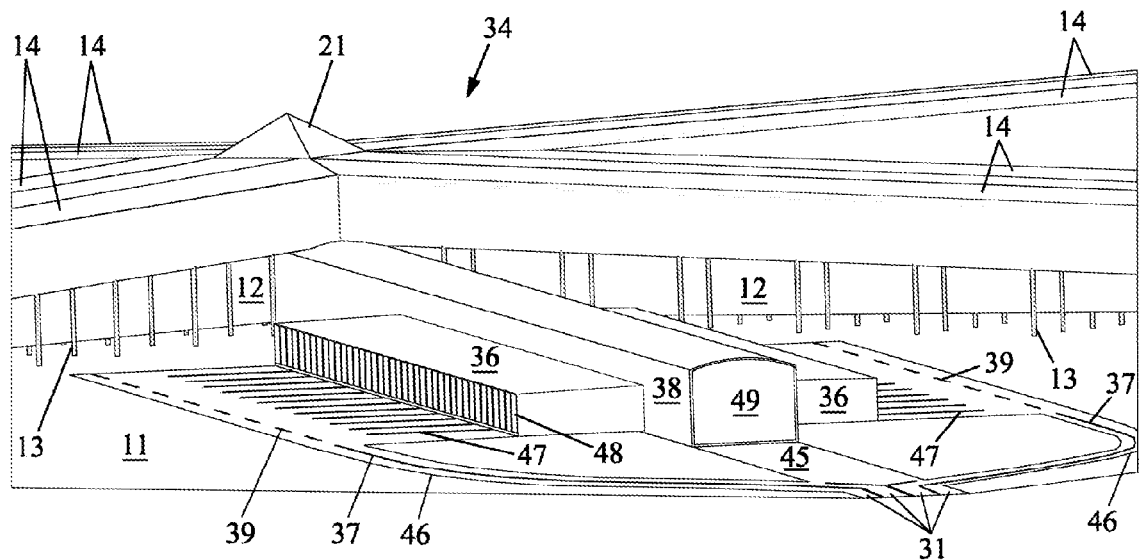
FIG. 7 is another partial enlarged prospective view of the intersection depicted in FIG. 3.
Figure 8:
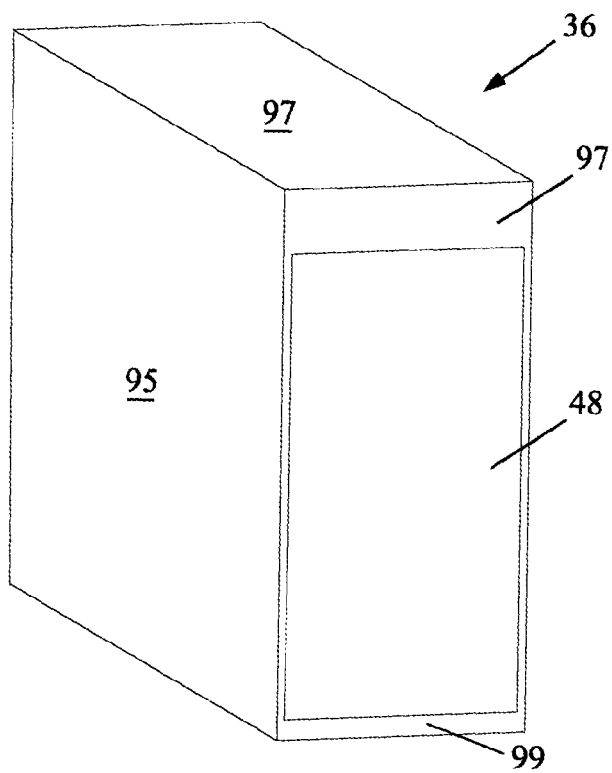
FIG. 8 is a perspective view of a freight terminal of the delivery system.
Figure 9:
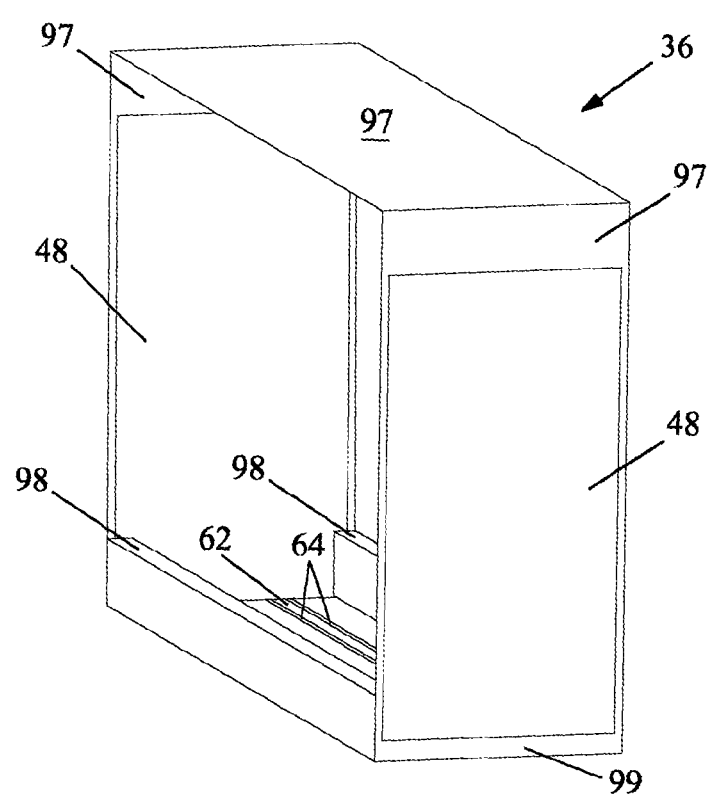
FIG. 9 is a perspective view of the freight terminal depicted in FIG. 8 with a side wall not shown.

As seen in FIGS. 6 and 7, passenger transportation sections 14 and maneuver sections 18 do not have entry or exit points at intersection 34 bypassing above the freight transportation sections 12 for not interfering with freight redirection. Each of the freight container terminals 36, as seen in FIGS. 8 and 9, comprises ceiling 97, walls 95, floor 99, two freight supports 98, two gates 48 and one transportation lane 62 located on floor 99. Each of the oversized freight terminals 38 (FIG. 7) resembles freight container terminal 36 but it has the same height, width, and number of transportation lanes as freight transportation section 12. Each of the oversized freight terminals 38 comprises an oversized gate 49 (FIGS. 3 and 7). Only one of the gates 48 of a terminal 36 (or of the gates 49 of a terminal 38) is opened at a time providing isolation of enclosure 10 from the outside environment as demonstrated, for instance, with an example of dropping off a freight container at terminal 36:

1) a customer makes a request to CCS, for instance by a smart phone, for transporting a container by filling a predetermined form with the container parameters and a projected arrival time in response CCS provides a password for the projected transaction and starts sending updates with a number of freight terminal 36 which may change before the customer is located within a predetermined distance from a predetermined point of enclosure 10 using, for instance, GPS (it must be understood that GPS location of the customer's smart phone obtained by CCS has nothing to do with the communication process between CCS and VCS since enclosure 10 blocks VCS signals to, and from, the outside environment, where CCS is able to communicate inside and outside of enclosure 10). For every currently selected freight terminal, CCS selects a vehicle 16 and projects a trip for arriving to the currently selected terminal 36 at the projected customer arrival time, even if the selected vehicle 16 is still in the process of completing its current trip under condition that the current trip will be finished before the projected trip to the terminal 36;

2) when CCS detects that the customer is within a predetermined point from enclosure 10, it commits the selected freight terminal 36 (won't change it) and actually guides the selected vehicle 16 to the committed terminal 36 (will select other vehicle 16 if the previously selected vehicle 16 is not available for any reason, broke for instance). After the selected vehicle 16 had arrived to the committed terminal 36, CCS opens the inner gate 48 (the outer gate 48 remains closed), guides the selected vehicle 16 to a predetermined loading point between supports 98, sends a command to VCS for lowering the top of the vehicle 16 (VCS will execute the command if the top is not lowered already; in addition, CCS command could be sent at any moment prior the arrival to the terminal), and closes the inner terminal gate;

3) the arrived customer sends an arrival message whether by a smart phone or using a keypad secured outside of the terminal 36 using the transaction password; and, in response, CCS opens the outer terminal gate. The customer loads its container on the supports 98 above the parked vehicle 16, exits the terminal 36 via the still opened outer gate 48, and sends a load completed message whether by a smart phone or the outside keypad using the password; in response, CCS closes the outer terminal gate, then opens the inner gate 48, then guides the loaded vehicle 16 out of terminal 36 simultaneously sending a command to VCS for lowering the top of the vehicle 16 with the container, closes the inner gate 48, and continues the vehicle guidance to the destination. The process of receiving a container by a customer at terminal 36 goes in reverse order.

Figure 39:
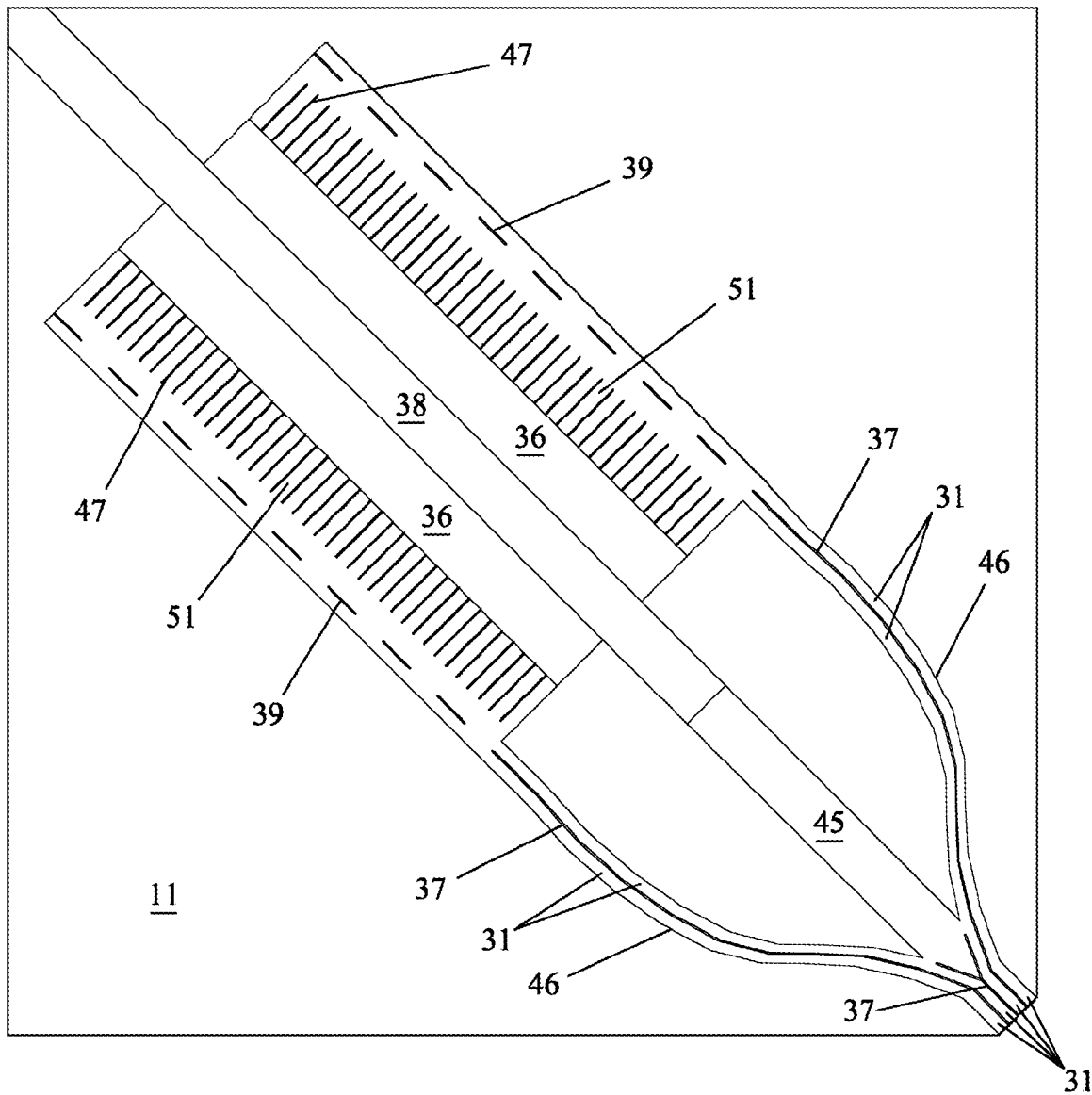
FIG. 39 is a partial enlarged view of freight terminals depicted in FIG. 5 demonstrating traffic lanes and traffic markings.
Figure 40:
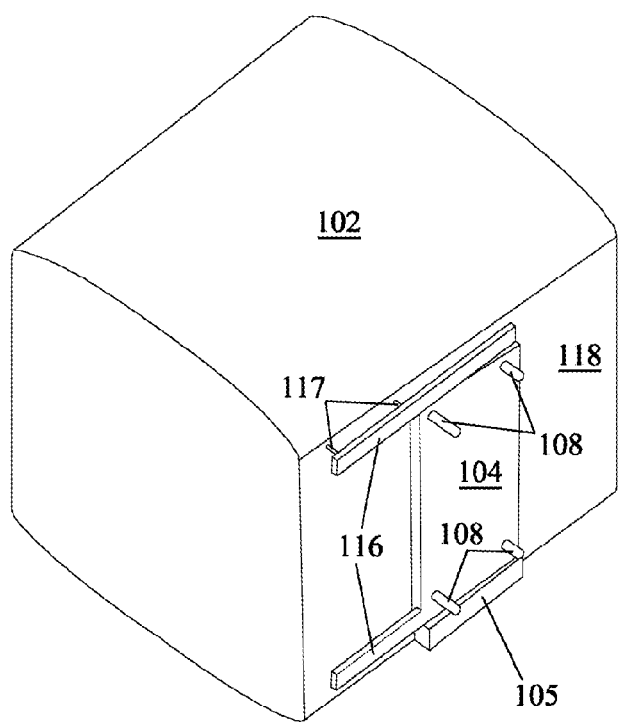
FIG. 40 is a perspective view of the passenger container depicted in FIG. 31.

Traffic markings on roadways 45 and 46 for freight drop-off and pick up are demonstrated in FIG. 39. Each roadway 46 comprises two traffic lanes 31 divided by solid line 37 and dashed line 39. Gate access 51 is marked by gate access traffic markings 47 located in front of each gate 48 (gate 48 not seen in FIG. 39) of the freight container terminals 36. Roadway 45 of the oversized freight terminal 38 will be utilized for oversized freight drop-off and pick up.

Figure 10:
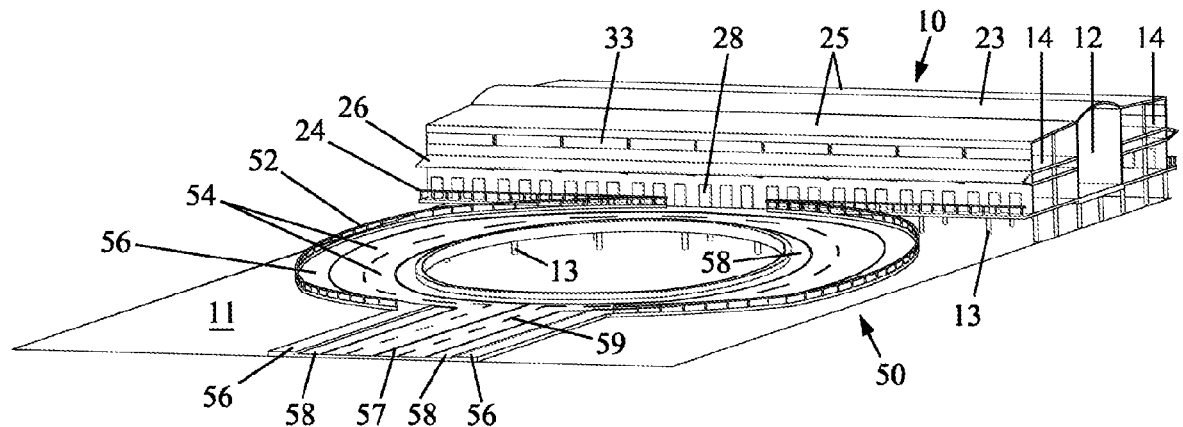
FIG. 10 is a perspective view of a passenger terminal of the delivery system.
Figure 11:
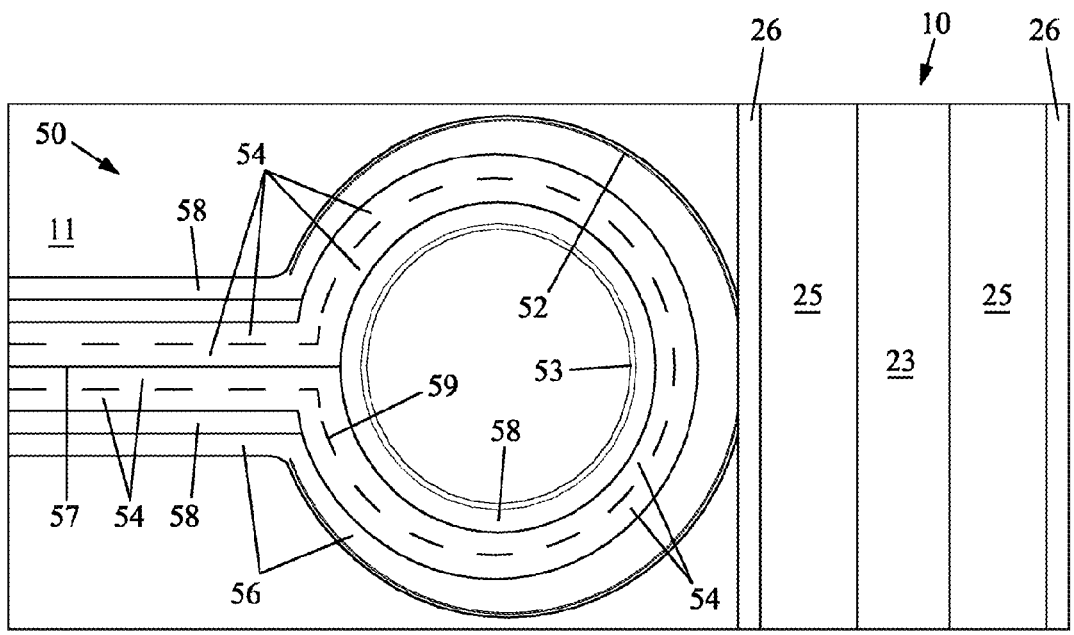
FIG. 11 is a top view of the passenger terminal depicted in FIG. 10.
Figure 12:
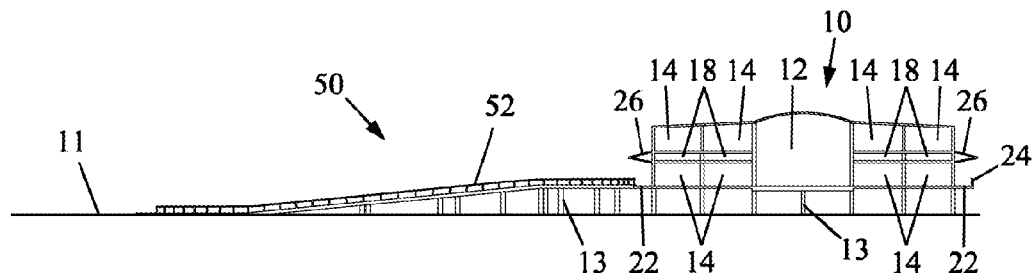
FIG. 12 is a side view of the passenger terminal depicted in FIG. 10.

A passenger terminal is demonstrated in FIGS. 10-12. It comprises a ramp 50 adjacent to enclosure 10. Ramp 50 comprises traffic lanes 54 divided by dashed line traffic markings 59 and solid line traffic marking 57, shoulders 58, a vehicle barrier 53, pedestrian walkways 56, and railing 52.

Figure 13:
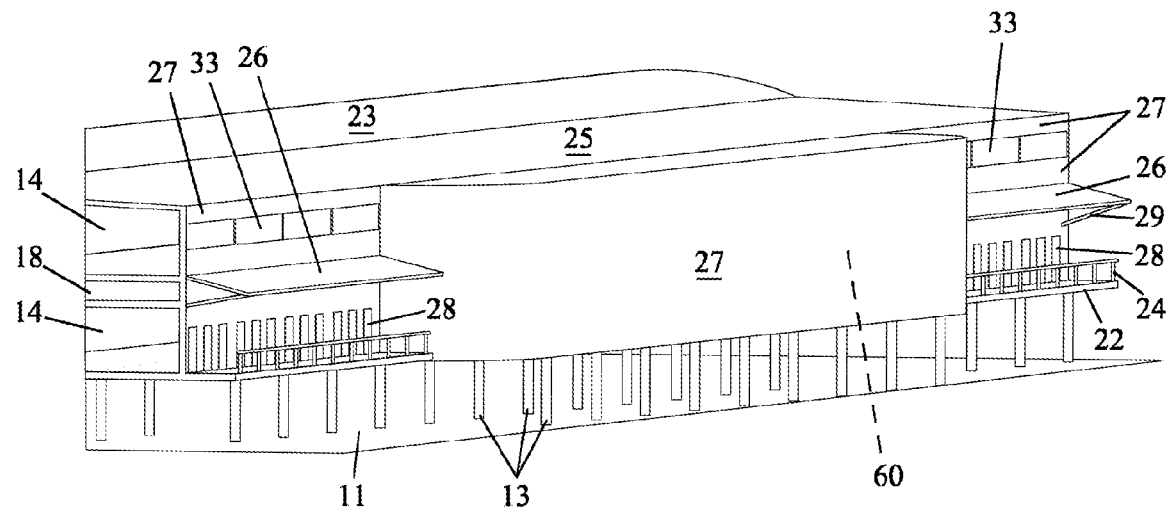
FIG. 13 is a perspective view of a switching ramp of the delivery system.
Figure 14:
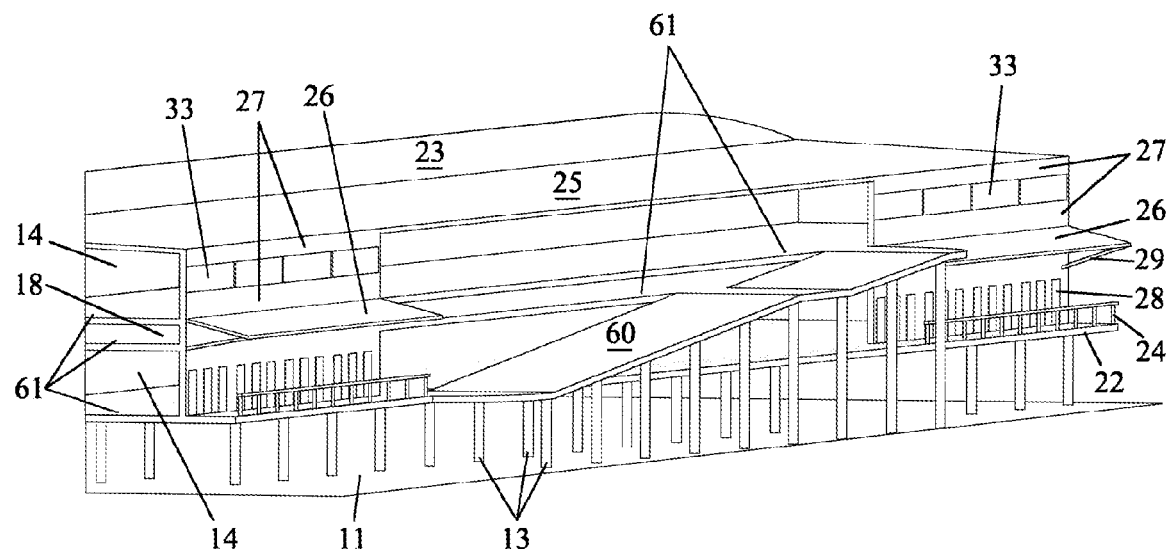
FIG. 14 is a perspective view of the switching ramp depicted in FIG. 13 with a side wall not shown.

FIGS. 13 and 14 demonstrate a switching ramp 60 dedicated for switching of the transportation vehicles 16 between passenger transportation sections 14 located on different levels and for switching of the transportation vehicles 16 between a passenger transportation section 14 and a maneuver section 18. Transportation lanes 62 and some of the columns 13 are not shown in FIGS. 13 and 14 for not interfering with comprehension of the drawings.

Enclosure 10 further comprises an electric power supply system used as a power source for propulsion of the transportation vehicles 16. Each of the transportation lanes 62 comprises two electrical conducting rails 64 installed into the floor 61 along the transportation lane 62 and RFID tags 66 installed under the floor 61 along the transportation lane 62 (FIG. 15). Each RFID tag 66 is preprogrammed with a unique id, defined hereinafter as an UID, for identifying a location on transportation lane 62.

Figure 22:
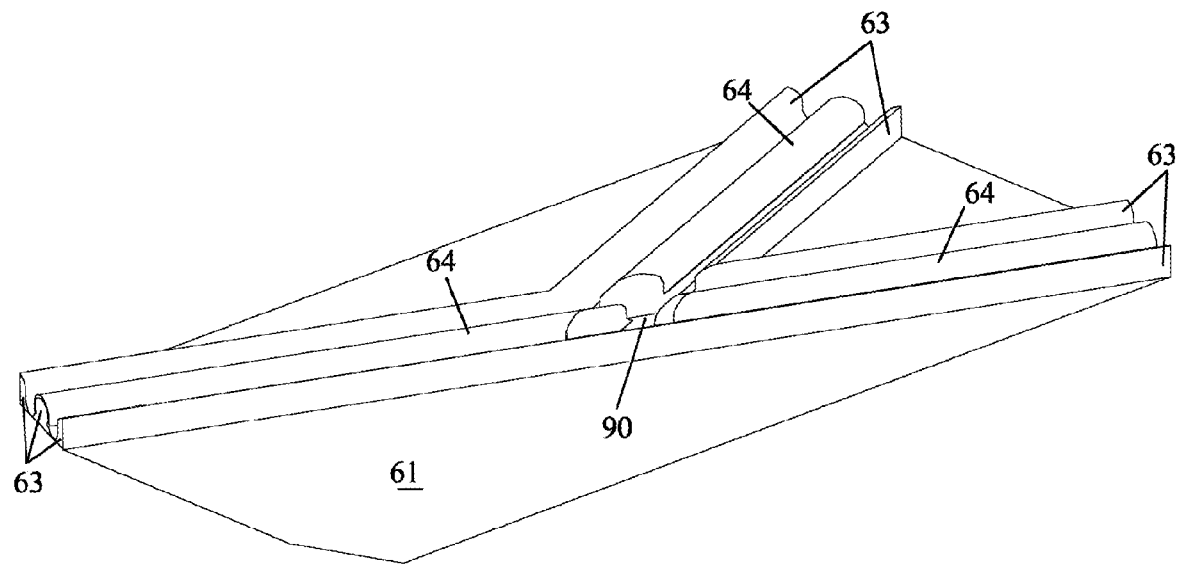
FIG. 22 is a partial perspective view of above the enclosure floor same polarity electrical rail intersection.
Figure 23:
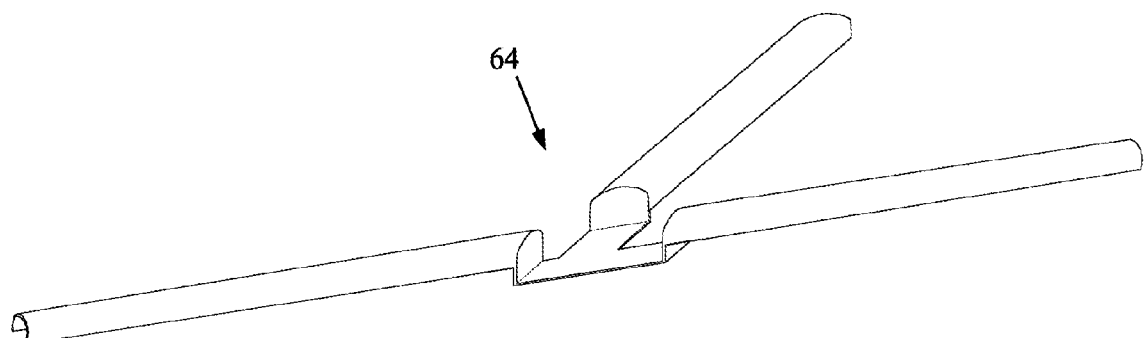
FIG. 23 is a partial perspective view of under the enclosure floor connection between same polarity electrical rails depicted in FIG. 22.
Figure 24:
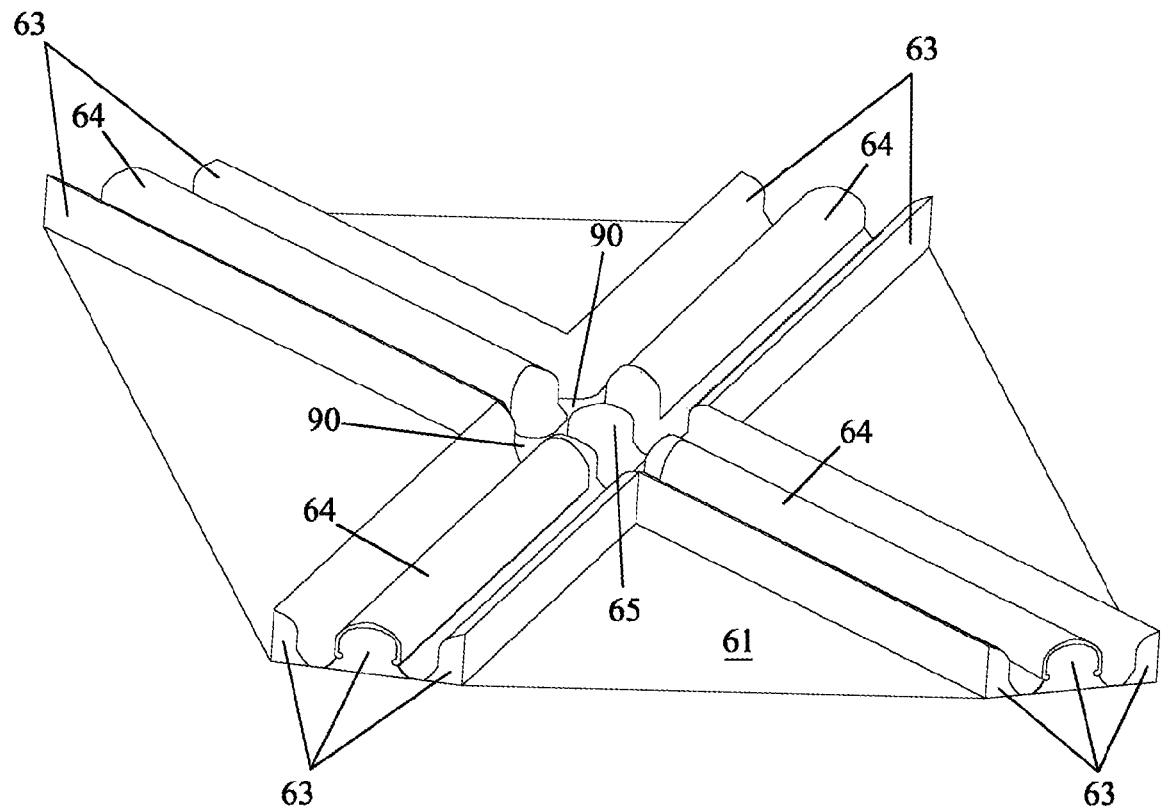
FIG. 24 is a partial perspective view of above the enclosure floor different polarity electrical rail intersection.
Figure 25:
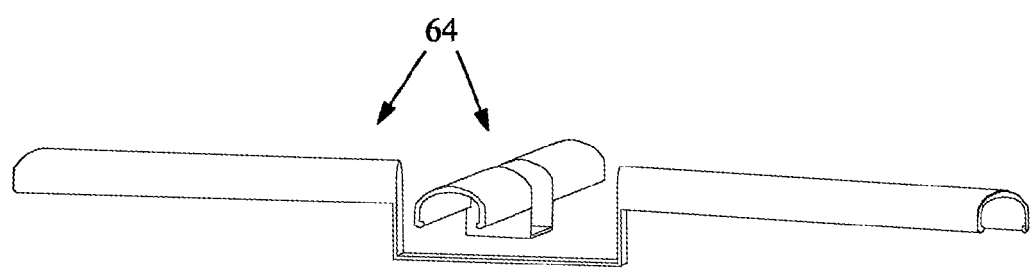
FIG. 25 is a partial perspective view of under enclosure floor connection between different polarity electrical rails depicted in FIG. 24.

FIG. 22 demonstrates same polarity intersection of rails 64, hosted by rail housing 63, and valley 90 located at the intersection point; and FIG. 23 demonstrates how rails 64 of the same polarity are connected under the floor 61 of enclosure 10. FIG. 24 demonstrates different polarity intersection of rails 64 hosted by rail housing 63 and a rail crossing isle 65 surrounded by valleys 90; and FIG. 25 demonstrates how rails 64 of the different polarity are connected under the floor 61 of enclosure 10.

FIGS. 16-18 depict a sample transportation vehicle 16 comprising a frame 71, a backup electrical rechargeable battery 73, a vehicle control system 70, defined hereinafter as VCS, for monitoring and managing transportation vehicle 16, and four driving wheels 15. Each of the driving wheels 15 is installed inside of a wheel housing 79 which is mounted to a wheel position power train 17 and is pivotal around vertical axis of the wheel position power train 17 controlled by VCS. A wheel propulsion power train 77 is mounted to each of the wheel housing 79 for providing propulsion power to driving wheels 15 when directed by VCS. Backup electrical rechargeable battery 73, VCS, and the driving wheel position power trains 17 are mounted to frame 71.

Transportation vehicle 16 further comprises two RFID sensors 68 for reading UIDs when positioned within a predetermined range of RFID tags 66. VCS comprises a location database for storing direction change for any predetermined point of transportation lanes 62 under RF tag an UID. A direction change is retrieved by VCS for each read UID for anticipating curves of transportation lane 62 by transportation vehicle 16.

Figure 19:
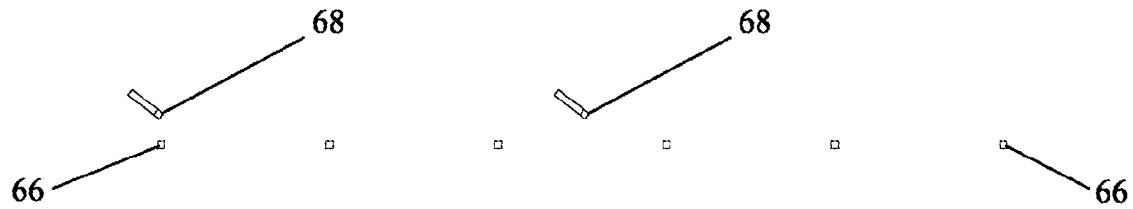
FIG. 19 is a side view of the transportation lane depicted in FIG. 15 shown only with RFID tags and RFID sensors of the transportation vehicle depicted in FIGS. 17 and 18.
Figure 20:
FIG. 20 is a top view of the transportation lane depicted in FIG. 15 shown only with RFID tags and RFID sensors of the transportation vehicle depicted in FIGS. 17 and 18.

FIGS. 19 and 20 depict RFID sensors 68 and RFID tags 66. In addition, RFID sensors 68 sense intensity of the UID signal from an RFID tag 66. A deviation from the center of transportation lane 62 is determined by VCS by comparing intensity of signals from at least two RFID tags 66 located on the opposite sides of the line perpendicular to transportation lane 62. VCS uses the deviation to keep transportation vehicle 16 in the middle of transportation lane 62 by adjusting direction of driving wheels 15.

Figure 21:
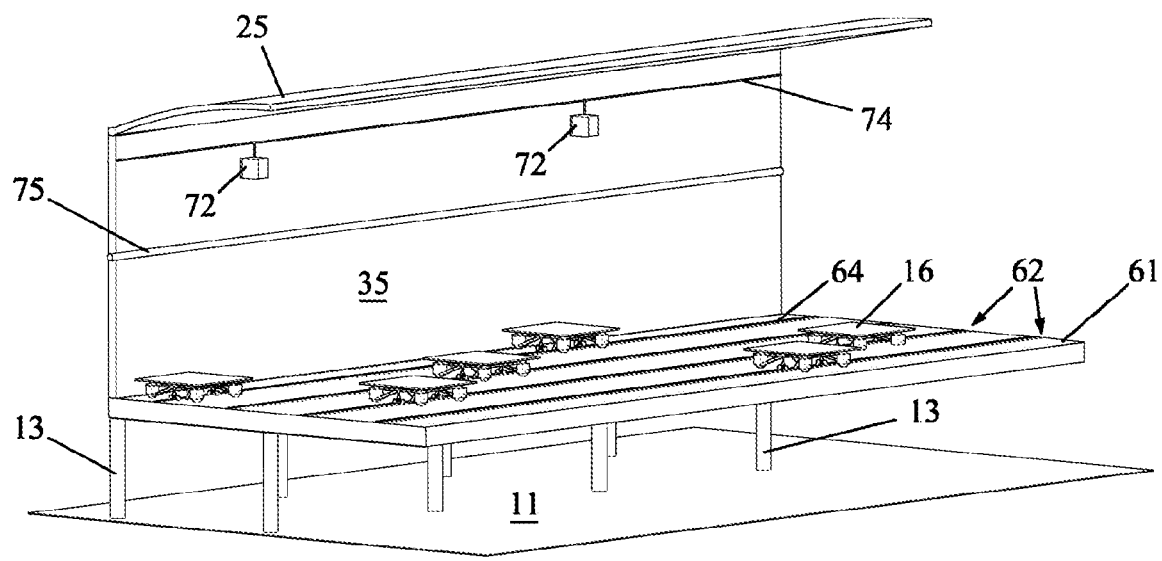
FIG. 21 is a partial perspective view of a passenger transportation section of the enclosure with a side wall not shown.

FIG. 21 depicts an electrical grid cable 75 installed throughout enclosure 10. In addition, FIG. 21 depicts a fiber-optic cable 74, which is a part of a software network, and enclosure RF transmitter/receivers 72 installed throughout enclosure 10. The enclosure RF transmitter/receivers 72 are connected to the fiber-optic cable 74 for communicating with CCS. The enclosure RF transmitter/receivers 72 maintain permanent communication sessions with CCS via the network. Transportation vehicle 16 further comprising a vehicle RF transmitter/receiver 76 connected to 70 VCS (best seen in FIG. 18). The enclosure RF transmitter/receivers 72 are positioned in a way to ensure that each of the transportation vehicles 16 is connected to at least two of the enclosure RF transmitter/receivers 72 via temporary communication sessions at any time and from any point of enclosure 10. Each of the transportation vehicles 16 is in constant communication with CCS via the temporary communication sessions.

CCS also comprises a location database for storing locations of the transportation lanes 62 under UIDs. VCS sends predetermined information about the transportation vehicle 16 to CCS in real time. This information includes last UID read; and CCS sends back to the transportation vehicle 16 a command based on overall enclosure 10 traffic condition. As a result, transportation vehicle 16 does not interfere with CCS in managing the traffic throughout enclosure 10, as demonstrated by the following example:

a) the VCS location database is identical to the CCS location database (the system may operate also when only CCS has the location database);

b) the two-way real time communication system operates, for instance, in Gigahertz diapason (for example, residential telephone remote handsets operate at 5.8 Gigahertz);

c) CCS sends commands to each VCS and each VCS sends messages to CCS, for instance, at a rate 1,000 per second via fiber optic cable 74 connecting stationary RF transmitter/receivers of enclosure 10 to CCS: since maximum number of vehicles capable of establishing temporary sessions with a RF transmitter/receiver is limited by a predetermined proximity range, the RF transmitter/receiver is able to provide RF communication between vehicles 16 and fiber optic cable 74 at a predetermined frequency;

d) if RFID tags 66 are stored closely, for instance, 1 inch apart, only a direction vector (angle) is stored between each pair of adjacent RFID tags 66 under their UIDs. In this case, VCS reports to CCS a last read UID only;

e) if RFID tags 66 are stored further than 1 inch apart from each other, a sequence of distance vectors of straight portions of transportation lane 62 between any two adjacent RFID tags 66 is stored. In this case, VCS keeps track of a distance vector from the last read RFID tag 66 and, optionally, reports it to CCS (in addition to a mandatory report of a last read UID), for instance, after every driven inch. For example, 60 miles*1760 yards*3 feet*12 inches/60 minutes/60 seconds/1,000 messages per second=1 inch (approximately) assuming that the vehicle speed is 60 miles per hour and that RFID tags 66 are 1 foot apart;

f) transportation vehicle 16 is controlled by CCS and VCS during a trip comprising a sequence of distance vectors chosen by CCS (only angles in case of the default 1 inch between adjacent RFID tags 66) starting from a current vehicle position to a destination position, where an exact vehicle position is a combination of a last read UID and an accumulated there from distance vector (just a last read UID in case of the default 1 inch between adjacent RFID tags 66); the trip vectors are always stored by CCS and, optionally, by VCS of the trip vehicle;

g) a speed limit is calculated (by CCS and/or VCS) such, at the end of each trip distance vector where change of a direction is required, that centrifugal force will not disrupt the trip. It is advisable to calculate speed limits for all direction change vectors for different weight categories and store them in each location database for reducing amount of calculations. More speed limit categories (cruise modes) may be stored in addition, for instance, aggressive, best amortization, fuel saving, passenger transportation, etc.;

h) if VCS comprises a copy of CCS location database, it may need only one next destination UID, for instance from CCS, before reaching its current destination UID (or VCS may retrieve it autonomously if CCS uploads to VCS a copy of the vehicle's trip vectors) and, since VCS is able to retrieve a distance vector between the two destination UIDs, it is able to adjust steering when reaching the current destination UID before a curve from the current destination UID to the next destination UID, at which point the next destination UID becomes a current destination UID and a new next destination UID is sent to VCS by CCS or, if VCS comprises a copy of all trip distance vectors, it is retrieved by VCS autonomously;

i) if different vehicle cruise modes are permitted, as in this example, CCS specifies to VCS a speed limit category before the trip; as the result, VCS is able to move its transportation vehicle 16 at the maximum (default) speed of the category where a braking distance before the end of a distance vector limits maximum speed of transportation vehicle 16 within the vector. For instance, if transportation vehicle 16 is moving along a straight line 100 miles vector and a speed limit at the end of the vector is 25 miles per hour for negotiating change to the next given by CCS vector (next destination UID), the only limitation of the vehicle speed before the direction change is a braking distance according to the specified before the trip by CCS cruise mode. For example, transportation vehicle 16 can travel 90 miles at a speed of 1000 miles per hour (mph) along a straight line 100 miles vector if an acceleration distance from 0 mph (at the start of the vector) to 1000 mph is 5 miles and a braking distance from 1000 mph to 25 mph is also 5 miles. Of course, if CCS would upload upfront all trip vectors along with the cruise mode to a VCS comprising a copy of the location database, the VCS would not need any guidance (next destination UID) from CCS at all, although it would still be obligated to report its current position to CCS for CCS to control traffic within enclosure 10. As the result, CCS knows at any moment all current trips, all current vehicle positions, and is able to calculate current speed of each transportation vehicle 16 dividing each reported thereby position change by the time interval between the position change reports (optionally, VCS can report current speed in addition to its current location). As was demonstrated, CCS knows a projected speed pattern within each distance vector of a trip (CCS and VCS have the same calculating algorithms) and, therefore, is able to calculate durations of all trips and positions of all transportation vehicles 16 at any movement during the trips;

j.) an algorithm for selecting a new trip must take into account collision avoidance between transportation vehicles 16 and may be implemented by CCS as follows (different programmer analysts may suggest different algorithms): when a new vehicle trip is about to be added (in case of a relational database, it is actually added temporarily and may be rolled back/deleted if unsatisfactory), select all trip distance vectors shared by at least two transportation vehicles 16 within a predetermined time resolution interval starting, for instance, from one hour; if at least one shared distance vector is found, repeat the selection reducing the time resolution interval; if less than a predetermined minimum time resolution interval has been reached and still no shared distance vectors are found, then no potential collision is detected, in which case the new trip is committed; otherwise, try to eliminate the sharing of distance vectors under the minimum time resolution interval by changing firstly speeds within the uncommitted trip (in such case CCS records a speed change legend for overwriting the default cruise mode maximum speed); if the speed adjustment did not eliminate sharing of distance vectors (very unlikely—suggests potentially a software bug), reroute: rollback the unsuccessful trip, select a different trip, and execute this algorithm again. Optionally, speed overwriting for one of the committed and sharing the distance vector trips may be attempted before the rerouting the uncommitted trip, in which case a speed legend is similarly stored for overwriting a default trip cruise mode;

k) during a vehicle trip, CCS can execute a speed legend, if any, itself by sending commands to VCS at appropriate moments, or upload the legend to VCS before the trip for executing it autonomously by VCS during the trip. Accordingly, traffic and collisions are avoided by executing all vehicle trips according to the projections; and in case of unforeseen circumstances, for instance, if at least one distance vector becomes unavailable, for example, in case of an obstacle, CCS selects and reroutes all affected transportation vehicles 16 by executing the algorithm of paragraph j) for selecting a new trip for each of them;

l) controlling a formation of transportation vehicles 16 simultaneously, for instance, for carrying an oversized object is accomplished by CCS in real time by overwriting a default cruise mode (speed correction) when necessary if any of the formation transportation vehicles 16 needs a correction (as was demonstrated all transportation vehicles 16 operate at a predetermined distance resolution defined by a frequency of message exchange between CCS and VCS; although 1 inch was demonstrated, ⅛ of an inch is achievable, for instance, by increasing the frequency from 1000 messages per second to 8000).

Transportation vehicle 16 further comprises two lost item receptacles 78 installed onto the frame 71 (best seen in FIG. 18). Each of the lost item receptacles 78 comprises a lost item sensor (not shown) connected to VCS. The lost item sensor senses encounter of a lost on a transportation lane 62 item with the lost item receptacle 78. The encounter is reported by VCS to CCS which, in turn, alerts authorized personnel. CCS, if requested by the authorized personnel, reroutes the transportation vehicle 16 to a lost item ditch (not shown) where the lost item is dropped. For clarity, the lost item receptacles 78 are not shown on transportation vehicles 16 in FIG. 21.

Figure 26:
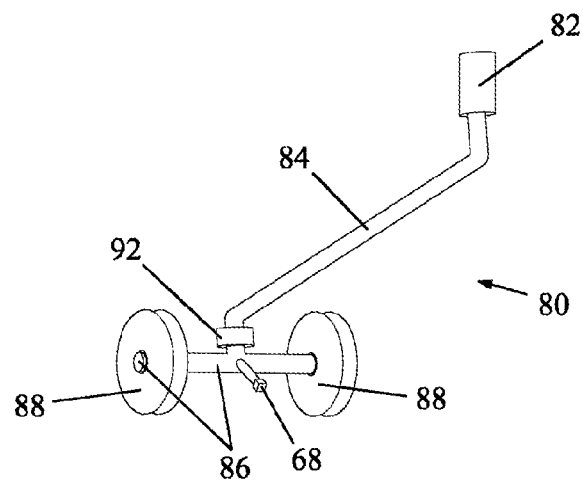
FIG. 26 is a partial perspective view of an electrical conductor assembly of the transportation vehicle.

Transportation vehicle 16 further comprises two electrical assemblies 80 installed onto the frame 71 (FIG. 16). Each of the electrical assemblies 80 (FIG. 26) comprises a pneumatic cylinder 82, an arm 84 pivotal around the pneumatic cylinder 82, a wheel mount 86 pivotal around the arm 84, and two electrical conducting wheels 88 pivotal when mounted onto the wheel mount 86. RFID sensors 68 described in paragraphs [0092] and are attached to the wheel mount 86 (FIGS. 17, 18, and 26). The conducting wheels 88 are adapted to engage with the electrical rails 64 for redirecting electrical power to the transportation vehicle 16 via electrical wires routed inside of the wheel mount 86 and the arm 84. Rail housing 63 seen in FIGS. 22 and 24 is adapted to prevent the conducting wheels 88 from disengaging from the rails 64. The pneumatic cylinder 82, guided by VCS, provides necessary pressure on the conducting wheels 88 for a reliable electrical contact. In addition, if the transportation vehicle 16 is passing over one of the intersections depicted in FIGS. 22 and 24, the pneumatic cylinder 82, one at a time, will raise the conducting wheels 88 right before the conducting wheels 88 encounter the valleys 90 and will put them back onto the electrical rails 64 after the conducting wheels 88 passed the intersection. While one of the arms 84 is raised, the other arm 84 continues to supply electricity to the transportation vehicle 16.

Figure 27:
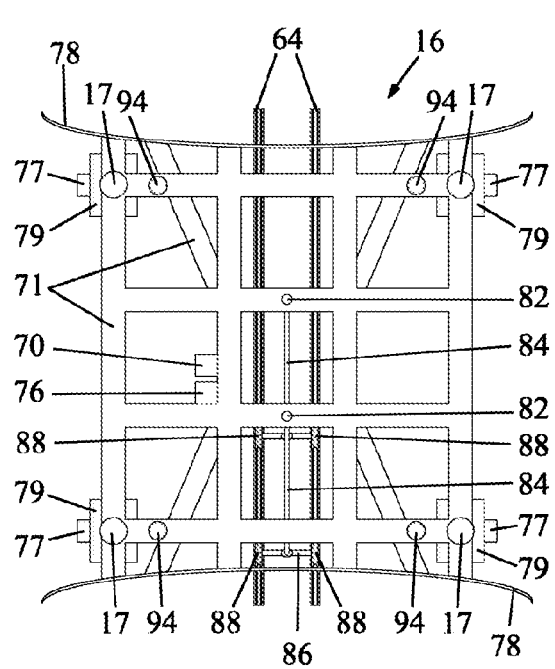
FIG. 27 is a top view of a transportation vehicle centered on the electrical rails.
Figure 28:
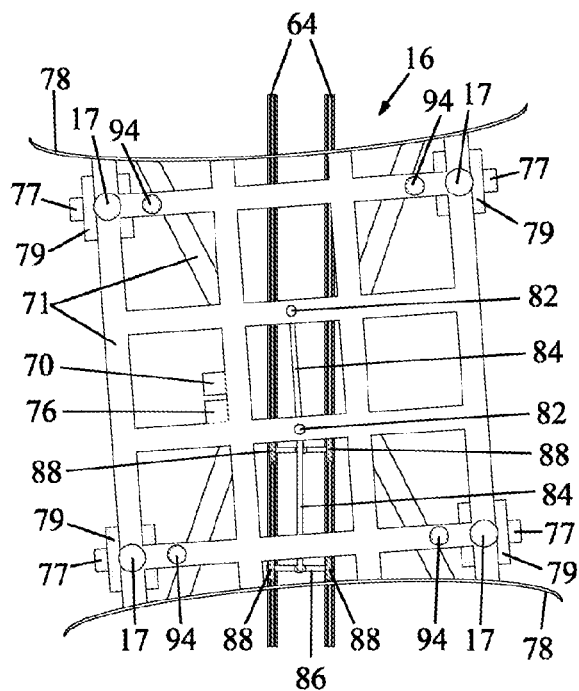
FIG. 28 is a top view of a transportation vehicle not centered on the electrical rails.

Each of the electrical assemblies 80 (FIG. 26) further comprises an arm position sensor 92 transmitting in real time to VCS a deviation between wheel mount 86 and arm 84. VCS compares the deviation with an expected vector to a destination UID stored in the location database of VCS under UID of last read by the vehicle RF tag 66 and corrects the difference for keeping the transportation vehicle 16 in the middle of the transportation lane 62 (FIGS. 26-28). For clarity, the floor 61 and the electrical rechargeable battery 73 are not shown in FIGS. 27 and 28.

Figure 29:
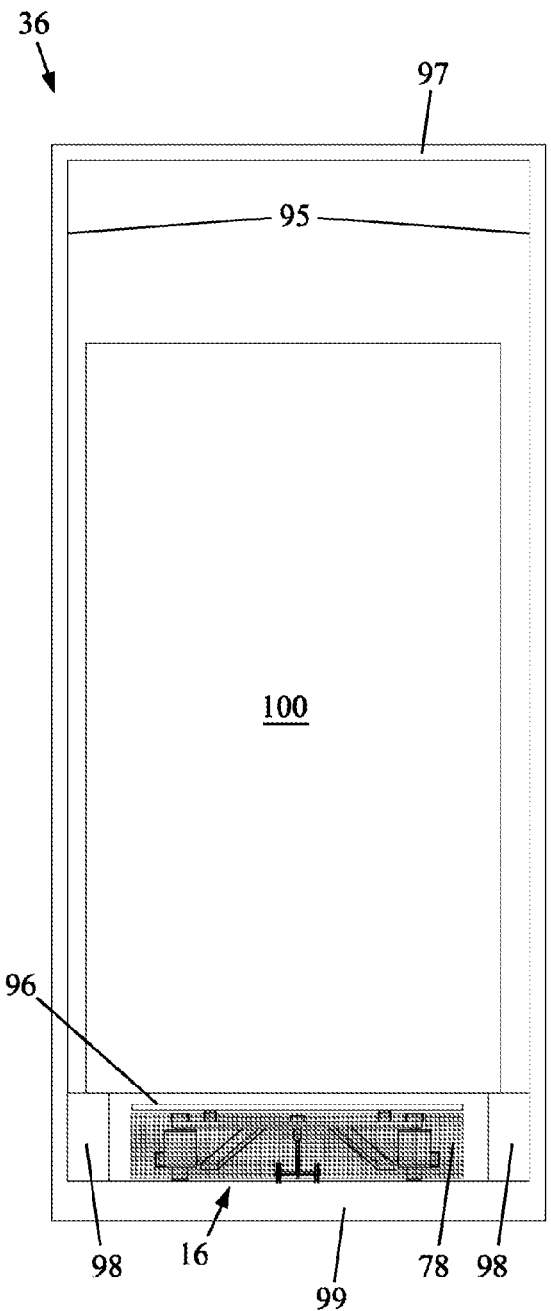
FIG. 29 is a side view of a freight terminal with the freight container above the transportation vehicle.
Figure 30:
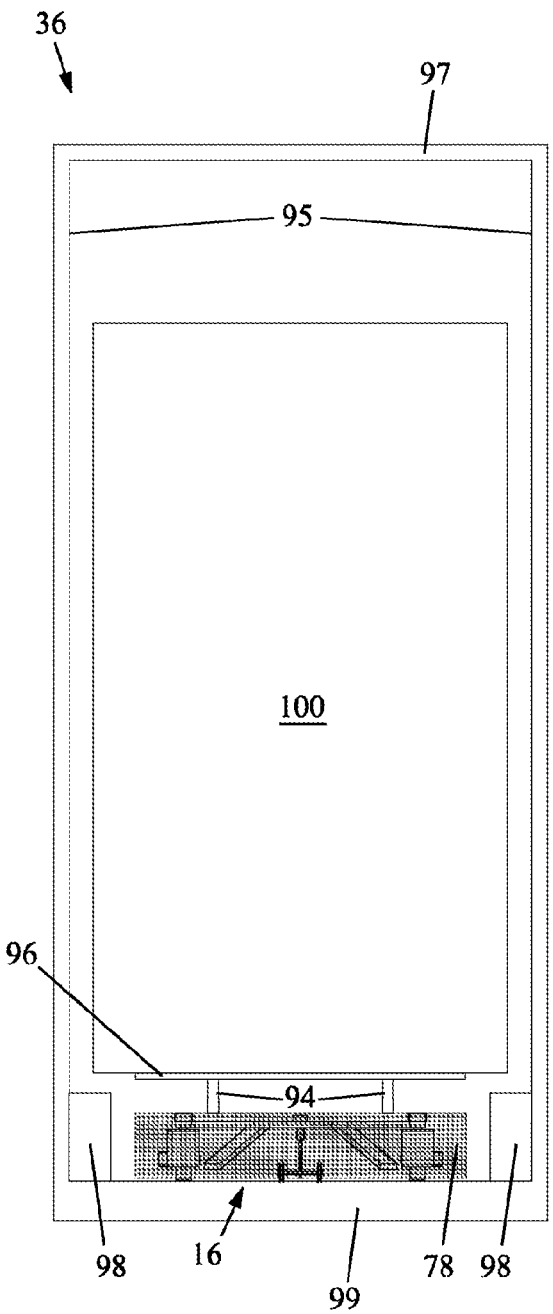
FIG. 30 is a side view of a freight terminal with the freight container loaded onto the transportation vehicle.
Figure 31:
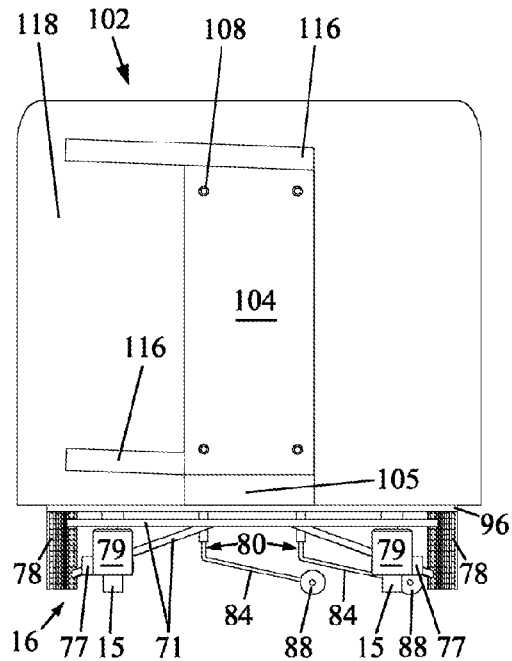
FIG. 31 is a side view of a passenger container on a transportation vehicle with the passenger container door closed.
Figure 32:
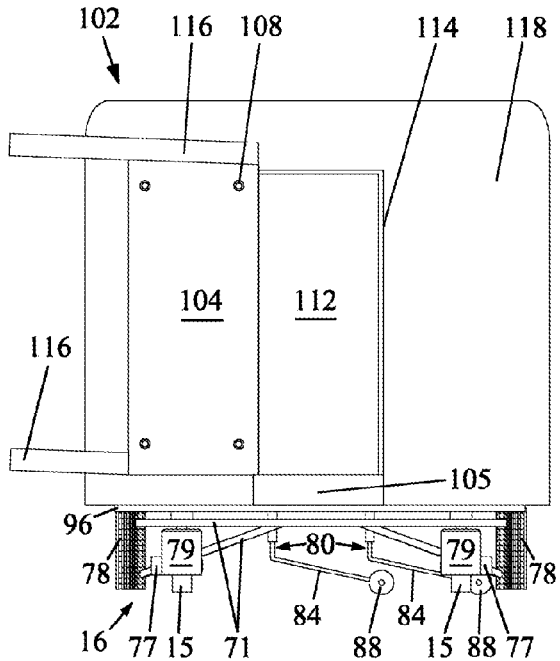
FIG. 32 is a side view of the passenger container depicted in FIG. 31 with the passenger container door opened.
Figure 33:
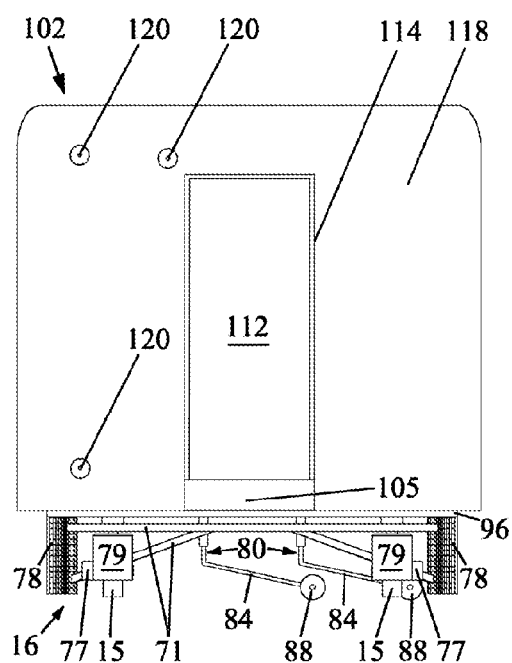
FIG. 33 is a side view of the passenger container depicted in FIG. 31 with the passenger container door and sliding bars not shown.

Transportation vehicle 16 further comprises four pneumatic cylinders 94 attached to frame 71 (FIG. 18) and a platform 96 attached to pneumatic cylinders 94 used for passenger container and freight pick up and drop-off. For exemplary purpose, a freight container 100 pick up in a freight container terminal 36 is demonstrated in FIGS. 29 and 30 (gates 48 are not shown). A customer is able to position a freight container 100 on freight supports 98 when gate 48 leading to outside is opened upon a customer request. After the gate leading outside is closed upon a customer request and gate 48 leading inside of enclosure 10 is opened, a transportation vehicle 16 is brought inside of the freight container terminal 36 between the freight supports 98 under the freight container 100 with its platform 96 being lower than the level of the freight supports 98. Then the platform 96 is raised by cylinders 94 above the level of the freight supports 98 picking up the freight container 100; and the transportation vehicle 16 is retrieved from the freight container terminal 36 with the freight container 100 on the platform 96. The container drop-off process goes in reverse order.

Figure 34:
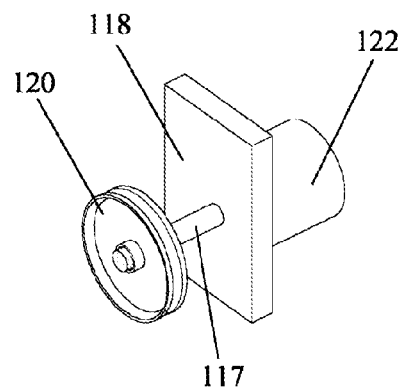
FIG. 34 is a partial prospective view of a sliding wheel, sliding wheel power train, and passenger container wall.
Figure 35:
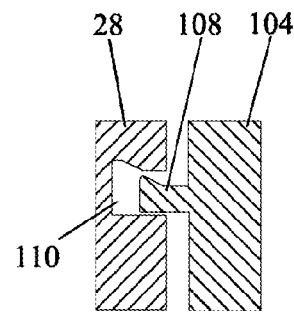
FIG. 35 is a side sectional view of a passenger container door boarding hook entering enclosure door hook receptacle.

FIGS. 31-33, 36, 38, and 40 demonstrate a sample passenger container 102 for transporting passengers by a transportation vehicle 16. Passenger container 102 comprises wall 118 (FIGS. 31-34), sliding wheels 120 (FIGS. 33 and 34) mounted on a sliding power train 122 via attachment parts 117 (FIG. 34), one passenger entrance 112, a rubber band 114 surrounding the passenger entrance 112 outside, a passenger entrance bumper 105 protruded from the body of the passenger container 102 below the passenger entrance 112, and one passenger container door 104 sealing the passenger entrance 112 via the rubber band 114 in a closed position. Passenger container door 104 is a straight trajectory sliding door (U.S. patent application Ser. No. 12/214,908 entitled "Straight Trajectory Sliding Shutter Apparatus"). Passenger container door 104 comprises sliding bars 116 slanted to the top (FIGS. 31-33) and to the right (FIGS. 36 and 38) and boarding hooks 108 best seen in FIGS. 35-37 and 40. Sliding wheels 120 of the container 102 are positioned inside of the sliding bars 116 of the passenger container door 104. Wall 118 of the passenger container 102 is parallel to the passenger container door 104 allowing the passenger container door 104 to unseal the entrance 112 when moved along the sliding bars 116 (FIGS. 31 and 32) by the sliding wheels 120 propelled by the sliding power train 122.

Figure 36:
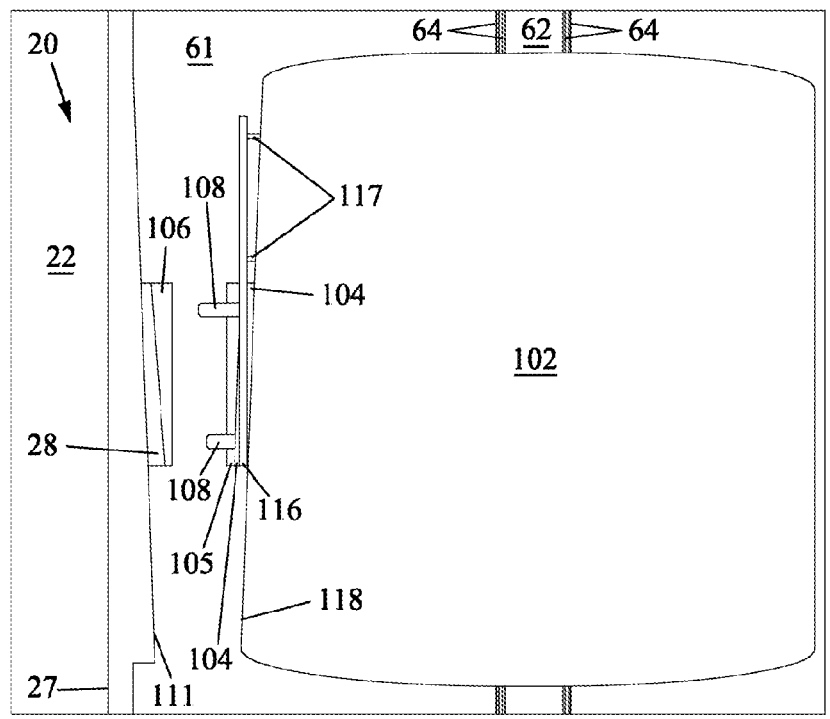
FIG. 36 is a top view of a passenger container positioned at a distance in front of a enclosure boarding door.
Figure 37:
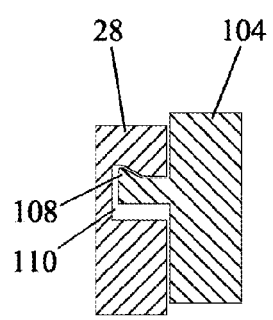
FIG. 37 is a side sectional view of the passenger container door boarding hook depicted in FIG. 35 engaged with the enclosure boarding door hook receptacle.
Figure 38:
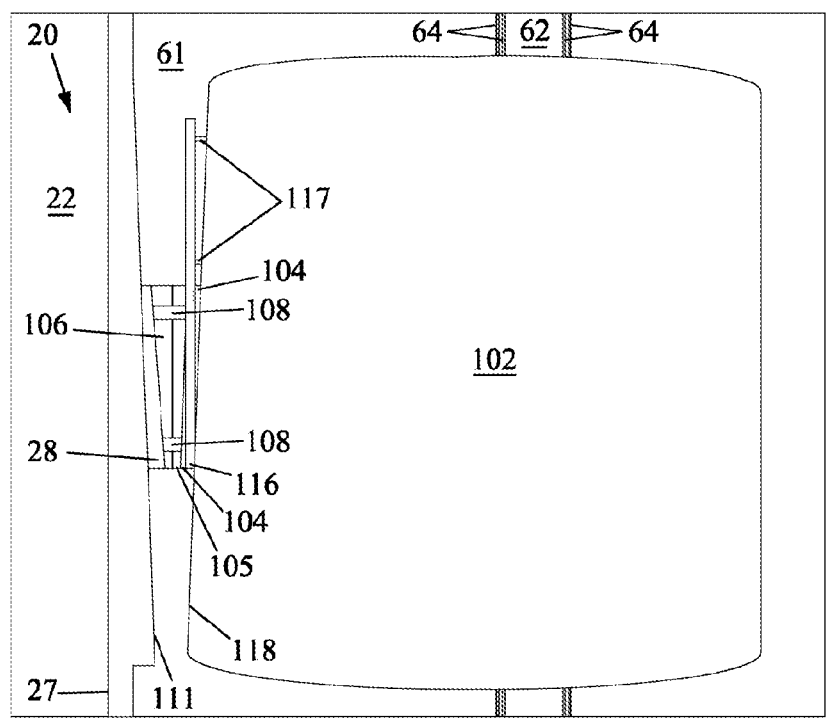
FIG. 38 is a top view of the passenger container moved to the front of the enclosure boarding door.
Figure 41:
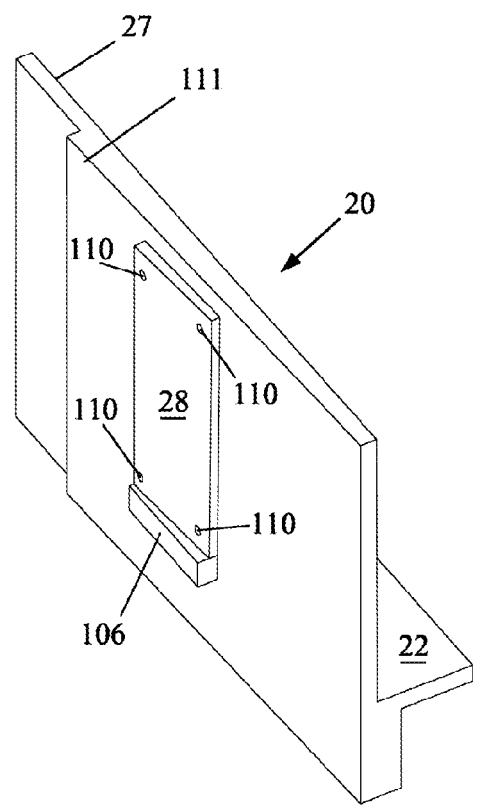
FIG. 41 is a perspective view of the enclosure boarding section depicted in FIG. 36.

The enclosure boarding passenger section 20 (FIGS. 36, 38, and 41) comprises a slanted wall 111 (as seen in FIGS. 36, 38, and 41), enclosure boarding door 28, and a enclosure entrance bumper 106 protruded from the wall 111 under enclosure boarding door 28 (best seen in FIG. 41). The enclosure boarding door 28 comprises door receptacles 110 for receiving the passenger container door hooks 108.

FIGS. 36 and 38 depict passenger container 102 delivered by transportation vehicle 16 (transportation vehicle 16 is not seen) such that the passenger container door 104 is aligned with the enclosure boarding door 28 (FIG. 36). Then the driving wheels 15 of transportation vehicle 16 are positioned perpendicular to the transportation lane 62 by the wheel position power train 17 and the passenger container 102 is moved by the wheel propulsion power train 77 of the transportation vehicle 16 toward the enclosure boarding door 28 until passenger entrance bumper 105 meets enclosure entrance bumper 106 and the passenger container door hooks 108 enter enclosure boarding door hook receptacles 110 (FIG. 38). The enclosure boarding door 28 is a straight trajectory sliding door (U.S. patent application Ser. No. 12/214,908 entitled "Straight Trajectory Sliding Shutter Apparatus") mirrored from the passenger container door 104; it seals the enclosure opening (not shown) via the enclosure rubber band (not shown) mirrored from the rubber band 114 of the passenger container 102. Now, the sliding power train 122 opens the passenger container door 104 and, via the boarding hooks 108, the enclosure boarding door 28. The enclosure boarding door 28 does not need sliding bars 116 since it is opened passively by the boarding hooks 108 of the passenger container door 104. The process of closing the doors and departing of passenger container 102 goes in reverse order.

Those who are skilled in the art will readily perceive how to modify the invention. Therefore, the appended claims are to be construed to cover all equivalent structures which fall within the scope and spirit of the invention.

What is claimed is:

1. A transportation system comprising:
a) an enclosure capable of preventing unexpected objects and substances of the outside environment from entering the enclosed space, said enclosure comprises a plurality of ports for a buffered entry from, and exit to, the outside environment such that the enclosed space other than space occupied by said plurality of ports is isolated from the outside environment at all times, said enclosure contains at least one transportation lane crossing at least one municipal border;
b) a central control system comprising at least one computer, said central control system is programmed for monitoring by authorized personnel and for alerting authorized personnel when a predetermined situation or an interference unexpected by said central control system occurs within said enclosure, said central control system is also programmed such that authorized personnel is capable of taking control thereof;
c) a plurality of vehicles, a vehicle of said plurality of vehicles is capable of moving along said at least one transportation lane, said vehicle comprises a vehicle control system, said vehicle control system is electronic and is capable of being programmed, said vehicle control system is programmed for controlling steering and propulsion of its vehicle, said vehicle also comprises a means for detecting a deviation thereof from the center line of a current transportation lane, said vehicle control system is also programmed for centering its vehicle within a current transportation lane by adjusting steering for compensating said deviation;
d) a communication system, said communication system is electronic and is capable of providing a two-way communication in real time between said central control system and said vehicle control system regardless of the vehicle location within said enclosure, said vehicle further comprises a means for detecting an obstacle, said vehicle control system is further programmed for informing said central control system about the detected obstacle,
said at least one transportation lane also comprises a plurality of unique identifiers positioned at a predetermined distance from each other along thereof, at least said central control system comprises a location database for storing the unique id of each of said plurality of unique identifiers and predetermined information relevant to the location of the unique identifier under the unique id which includes at least the configuration of the adjacent portion of the transportation lane,
said vehicle furthermore comprises a means for sensing the closest unique identifier, said vehicle controlled system is also programmed for communicating the closest unique id to said central control system, thereby said central control system is further capable of guiding said plurality of vehicles without human assistance along each functional transportation lane such that traffic congestions and collisions between the vehicles are prevented.

2. The transportation system of claim 1 wherein said enclosure further contains an electric grid capable of collecting and distributing electricity outside of said enclosure and capable of powering said plurality of vehicles.

3. The transportation system of claim 1 wherein said enclosure further contains at least one pipeline.

4. The transportation system of claim 1, further comprising a shield for preventing transfer of predetermined objects and substances between geographic areas divided by the built above ground enclosure.

5. The transportation system of claim 1 wherein said central control system is furthermore programmed to provide the populace outside of said enclosure with access to predetermined communication services of said communication system and to computational power of the control systems using said communication system.

6. The transportation system of claim 1 wherein said enclosure is sealed air tight.

7. The transportation system of claim 6 wherein said enclosure is filled with at least one predetermined gas.

8. The transportation system of claim 1 wherein said communication system comprises a predetermined electronic network and a plurality of static RF-transmitter-receivers connected to said network, said central control system is also connected to said network, each of said plurality of static RF-transmitter-receivers is for maintaining a permanent communication session with said central control system via said network,
said vehicle further comprises a dynamic RF-transmitter-receiver connected to said vehicle control system for establishing and maintaining an RF based temporary communication session with any of said plurality of static RF-transmitter-receivers located within a predetermined distance from said dynamic RF transmitter/receiver, said plurality of static RF-transmitter-receivers is positioned such that said dynamic RF-transmitter-receiver is able to stay connected with at least two of said plurality of static RF-transmitter-receivers via the temporary communication sessions at any moment and from any point inside of said enclosure.

9. The transportation system of claim 1 wherein each of said plurality of unique identifiers is a RFID tag preprogrammed with a unique id.

10. The transportation system of claim 1 wherein said central control system is also programmed to synchronize movements of a predetermined number of said plurality of vehicles for transporting objects larger than permitted for transport by any one of said plurality of vehicles.

* * * * *